United States Patent [19]

Kanda

[11] Patent Number: 4,786,036
[45] Date of Patent: Nov. 22, 1988

[54] RESILIENT BUSHING STRUCTURE FILLED WITH VISCOUS FLUID

[75] Inventor: Ryouji Kanda, Inuyama, Japan

[73] Assignee: Tokai Rubber Industries, Ltd., Aichi, Japan

[21] Appl. No.: 73,286

[22] Filed: Jul. 14, 1987

[30] Foreign Application Priority Data

Jul. 16, 1986 [JP] Japan .................. 61-167440

[51] Int. Cl.$^4$ .................................. F16F 1/36
[52] U.S. Cl. .................. 267/140.1; 248/562; 248/636
[58] Field of Search ............ 267/140.1, 141, 141.3, 267/281, 219, 257, 136, 140, 141.7, 122, 75, 113; 248/562, 608, 609, 636; 188/322.5

[56] References Cited

U.S. PATENT DOCUMENTS

| | | | |
|---|---|---|---|
| 3,642,268 | 2/1972 | Hipsher | 267/281 |
| 3,698,703 | 10/1972 | Hipsher | 267/219 |
| 4,032,202 | 6/1977 | Ishikawa et al. | 267/281 |
| 4,588,174 | 5/1986 | Konishi | 267/35 |
| 4,630,806 | 12/1986 | Dan et al. | 267/140.1 |

FOREIGN PATENT DOCUMENTS 0010138 1/1986 Japan .................. 267/140.1

Primary Examiner—Andres Kashnikow
Assistant Examiner—Mark T. Le
Attorney, Agent, or Firm—Parkhurst, Oliff & Berridge

[57] ABSTRACT

A fluid-filled resilient bushing including a generally annular resilient member interposed between inner and outer sleeves and having a generally annular recess open in the outer circumferential surface of an axially intermediate portion thereof. The outer sleeve fluid-tightly closes the annular recess, and thereby cooperates with the resilient member to define a generally annular fluid chamber filled with a viscous fluid. The bushing has portions for defining a pair of shearing gaps as two opposite portions of the annular fluid chamber which are opposite to each other diametrically of the inner sleeve, in a first diametric direction perpendicular to a second direction in which the bushing receives a vibrational load. The pair of shearing gaps extend substantially in the second diametric direction, and each gap has a dimension as measured in the first diametric direction, which dimension is determined to be small enough to enable masses of the viscous fluid in the shearing gaps to provide a viscosity resistance upon application of shearing stresses to the fluid masses due to the vibrational load received by the bushing.

13 Claims, 3 Drawing Sheets

RESILIENT BUSHING STRUCTURE FILLED WITH VISCOUS FLUID

BACKGROUND OF THE INVENTION

1. Field of the Invention

The present invention relates generally to a fluid-filled resilient or elastic bushing, and more particularly to an improved vibration damping and isolating resilient bushing for automotive vehicles, which is filled with a viscous fluid and utilizes a viscosity resistance of the fluid exhibited upon application of shearing stresses to the fluid masses.

2. Discussion of the Prior Art

There are known various resilient vibration damping and isolating mounting or bushing structures, such as body mounts, cab mounts, cross-member mounts, strut-bar cushions, tension-rod bushings, suspension arm bushings, and engine-roll stoppers for FF vehicles. These resilient mounting or bushing structures are required to effectively absorb or damp a vibrational energy where the input vibrational load has large amplitude, like vibrations as produced upon a sudden start of a vehicle, upon application of an abrupt brake to the vehicle, or during shaking movements of its engine. Further, the structures are required to damp continuous resonance vibrations, for reducing a force to be transmitted therethrough. The structures are also required to isolate high-frequency vibrations having a comparatively small amplitude, which are generated during normal operation of the engine or due to irregularities of the road surface. In short, these resilient mounting or bushing structures are generally required to exhibit high damping capability for low-frequency vibrations having a large amplitude, and a relatively low dynamic spring rate or constant for high-frequency vibrations having a small amplitude.

Usually, the resilient mounting or bushing structures employ a solid rubbery or elastomeric material. Accordingly, a resilient structure adapted to provide high damping characteristics tends to have a high dynamic spring constant for high-frequency vibrations having a small amplitude. Conversely, if a resilient structure is adapted to provide a low dynamic spring constant for high-frequency vibrations without changing the static spring constant, the resilient structure necessarily exhibits low damping characteristics. Therefore, the mere selection of a suitable rubbery material does not permit such resilient structures to provide two different characteristics, that is, high damping capability for low-frequency vibrations, and high isolating capability for high-frequency vibrations.

In the light of the above drawback, a fluid-filled resilient mounting or bushing structure has been proposed in recent years. An example of such a fluid-filled resilient structure is disclosed in U.S. Pat. No. 3,642,268 and U.S. Pat. No. 3,698,703. This fluid-filled structure has two fluid chambers filled with an incompressible fluid. These chambers communicate with each other through an orifice provided therebetween. Upon application of a vibrational load to the structure, the volume of one of the two fluid chambers is reduced, and the fluid is forced to flow through the orifice from that one fluid chamber to the other. In this type of resilient mounting or bushing structure, the input low-frequency vibrations can be effectively damped due to inertia and resonance of the fluid mass in the orifice when the fluid is forced to flow through the orifice. The frequency range of the vibrations to be damped can be selected by suitably dimensioning the orifice.

If the orifice connecting the two fluid chambers of this type of fluid-filled structure is dimensioned (in terms of its length and cross sectional area or diameter) so as to provide excellent damping characteristics for low-frequency vibrations, then the vibration isolating capability of the structure is accordingly reduced for vibrations having comparatively high frequencies and small amplitudes. In other words, the resilient structure is too stiff to effectively isolate high-frequency vibrations. Thus, there has been a need to develop a fluid-filled resilient mounting or bushing structure which is satisfactory in the overall vibration damping and isolating capability or characteristics.

SUMMARY OF THE INVENTION

It is accordingly an object of the present invention to provide a fluid-filled resilient bushing which is capable of exhibiting a sufficiently soft spring characteristic for high-frequency vibrations, or a substantially consistent damping effect independently of the frequency of input vibrations.

The above object may be attained according to the principle of the present invention, which provides a fluid-filled resilient bushing, comprising: (a) an inner sleeve; (b) an outer sleeve disposed in radially outwardly spaced-apart relation with the inner sleeve; (c) a generally annular resilient member interposed between the inner and outer sleeves, so as to resiliently connect the inner and outer sleeves, the generally annular resilient member including an axially intermediate portion which has a generally annular recess open in an outer circumferential surface thereof, the outer sleeve fluid-tightly closing the annular recess, and thereby cooperating with the resilient member to define a generally annular fluid chamber filled with the viscous fluid; and (d) gap-forming means for defining a pair of shearing gaps as two opposite portions of the annular fluid chamber which are opposite to each other diametrically of the inner sleeve, in a first diametric direction perpendicular to a second diametric direction (P) in which the bushing receives a vibrational load. The pair of shearing gaps extend substantially in the second diametric direction. Each of the shearing gaps has a dimension as measured in the first diametric direction, which dimension is determined to be small enough to enable masses of the viscous fluid in the shearing gaps to provide a viscosity resistance upon application of shearing stresses to the masses due to the vibrational load received by the bushing.

In the fluid-filled resilient bushing of the present invention constructed as described above, input vibrations can be effectively damped based on a viscosity resistance of the viscous fluid masses in the shearing gaps, which is manifested upon application of shearing stresses to these fluid masses due to relative displacement of the inner and outer sleeves. The damping effect provided by the viscosity resistance of the viscous fluid is substantially consistent throughout the entire frequency range of the input vibrations. That is, the force transmitted by the present fluid-filled bushing is unchanged, irrespective of the frequency of the input vibrations. Thus, the instant bushing is capable of exhibiting excellent damping characteristic, even for the high-frequency vibrations, contrary to various type of conventional fluid-filled bushings or mounted structures. This is an important industrial significance of the present invention.

According to one feature of the invention, each of the pair of shearing gaps is substantially U-shaped in cross section in a plane parallel to an axis of the bushing and the first diametric direction, such that an U-shape of each of the shearing gaps is open toward the inner sleeve. Preferably, the dimension of the pair of shearing gaps is selected within a range of 1-6 mm.

According to a further feature of the invention, the viscous fluid consists of a silicone oil. The viscous fluid has a kinematic coefficient of viscosity of at least 1000 cSt (centistokes), preferably at least 10,000 cSt, and more preferably within a range between 100,000 and 1,000,000 cSt.

According to a still further feature of the invention, the gap-forming means comprises the outer sleeve, and a radial protrusion which protrudes radially outwardly from the inner sleeve into the generally annular fluid chamber. In this case, at least a portion of the radial protrusion directly facing an inner circumferential surface of the outer sleeve is preferably formed of an elastomeric material.

In one form of the above feature of the invention, the outer sleeve and the radial protrusion cooperate with each other to define a pair of second gaps as two opposite portions of the generally annular fluid chamber which are opposite to each other diametrically of the inner sleeve, in the second direction. Each of the second gaps may be substantially arcuate in cross section in a plane perpendicular to an axis of the bushing. Preferably, a dimension of each of the pair of second gaps as measured in the second diametric direction is within a range of 1-6 mm.

In another form of the above feature of the invention, the radial protrusion consists of a metal ring fitted on the inner sleeve, and a rubber layer covering the metal ring.

In a further form of the same feature of the invention, the radial protrusion has a substantially rectangular shape in cross section in a plane perpendicular to an axis of the bushing. The pair of shearing gaps are partially defined by a pair of opposite long sides of the substantially rectangular cross sectional shape.

BRIEF DESCRIPTION OF THE DRAWINGS

The above and optional objects, features and advantages of the present invention will be better understood by reading the following description of a preferred embodiment of the invention, when considered in connection with the accompanying drawings, in which.

DETAILED DESCRIPTION OF THE PREFERRED EMBODIMENT

Figure 1:
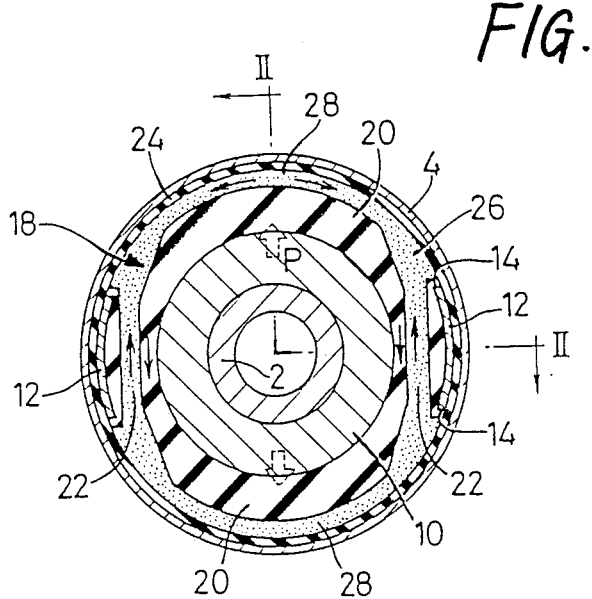
FIG. 1 is an elevational view in transverse cross section of one embodiment of a fluid-filled resilient bushing of the invention.
Figure 2:
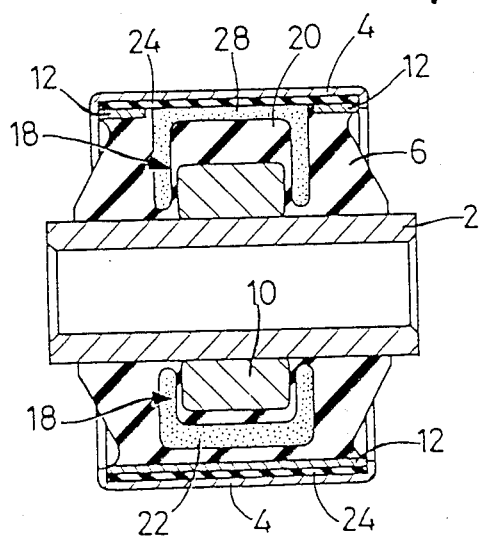
FIG. 2 is an elevational view in axial cross section taken along line II—II of FIG. 1.

Referring first to transverse and axial cross sectional views of FIGS. 1 and 2, there is shown a resilient bushing structure filled with a viscous fluid, constructed according to one embodiment of the invention, as a tension rod bushing used on a motor vehicle.

In the figures, the fluid-filled bushing structure is shown, including an inner sleeve 2 made of a metallic material and having a relatively large wall thickness, an outer sleeve 4 also made of a metallic material and disposed radially outwardly of the inner sleeve 2, and a generally annular resilient member in the form of a rubber block 6 made of a suitable rubbery material and interposed between the inner and outer sleeves 2, 4 for resiliently connecting the two sleeves 2, 4. The bushing structure is installed on the vehicle such that a suitable cylindrical fitting secured to the end of a tension rod of the vehicle is pressed-fitted on the outer circumferential surface of the outer sleeve 4, while a suitable connected rod secured to a body or axle of the vehicle is inserted through the inner sleeve 2.

Figure 3:
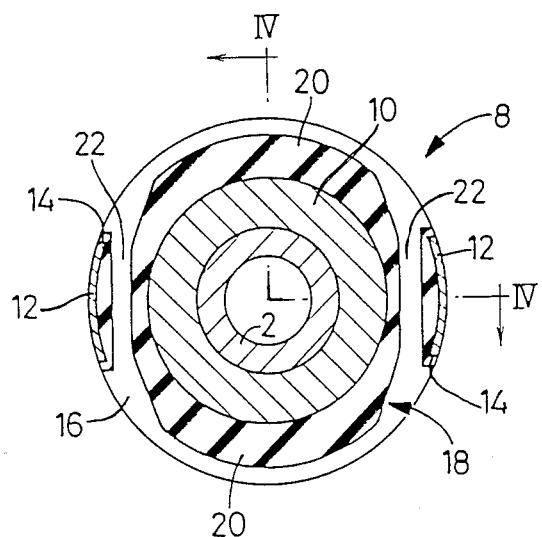
FIG. 3 is an elevational view in transverse cross section of a sub-assembly of the bushing, including an inner sleeve and a rubber block secured to the inner sleeve by vulcanization.
Figure 4:
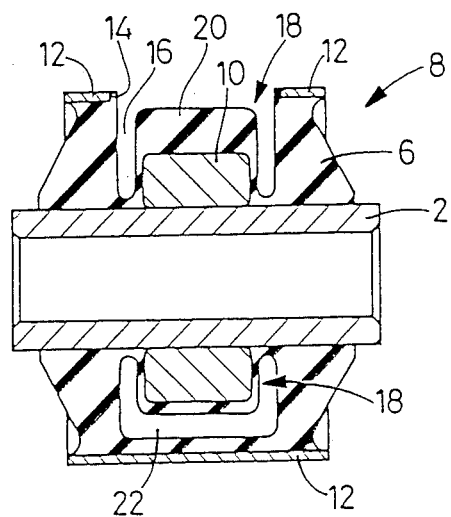
FIG. 4 is a cross sectional view taken along line IV—IV of FIG. 3.

The bushing structure as assembled includes an integral sub-assembly 8 which comprises the rubber block 6 secured to the outer circumferential surface of the inner sleeve 2 during forming of the rubber block by means of vulcanization, as indicated in FIGS. 3 and 4. The sub-assembly 8 further comprises a metal ring 10 secured to an axially intermediate portion of the inner sleeve 2, and an intermediate metal sleeve 12 pressed-fitted on the outer circumferential surface of the rubber block 6. The metal ring 10 has a comparatively large wall thickness, but its outside diameter is considerably smaller than the diameter of the intermediate metal sleeve 12. As most clearly shown in FIG. 3, the metal sleeve 12 has a pair of diametrically opposite rectangular apertures 14, 14. In preparing the sub-assembly 8, the inner sleeve 2 with the metal ring 10 pressed-fitted thereon, and the intermediate metal sleeve 12 are properly positioned relative to each other within a mold, and an unvulcanized rubber material is poured into the mold, so that the rubber block 6 is secured to the inner sleeve 2 and the metal ring 10 by means of vulcanization of the unvulcanized material. The prepared sub-assembly 8 is radially inwardly pre-compressed, by using drawing dies arranged around the circumference of the metal sleeve 12.

The generally annular rubber block 6 has a generally annular recess 16 formed in an axially intermediate portion thereof. This annular recess 16 has a suitable axial dimension larger than that of the metal ring 10, as indicated in FIG. 4, and is open in the outer circumferential surface of the diametrically opposite portions of the rubber block 6 which are aligned with the diametrically opposite apertures 14 formed in the metal sleeve 12, as most clearly shown in FIG. 3.

Described more specifically, the metal ring 10 press-fitted on the inner sleeve 2 is positioned within the generally annular recess 16, and is covered by a rubber layer 20 formed as an integral part of the rubber block 6. The rubber layer 20 is formed so that the rubber layer 20 cooperates with the metal ring 10, to provide a generally rectangular radial protrusion 18 which protrudes radially outwardly from the axially intermediate portion of the inner sleeve 2. The radial protrusion 18 has a substantially rectangular shape is cross section is a plane perpendicular to a centerline of the inner sleeve 2, i.e., an axis of the bushing structure, as seen in FIG. 3.

Namely, the rubber layer 20 formed on the metal ring 10 has a larger thickness at its opposite short sides of the rectangle aligned with the apertures 14, 14, than at its opposite long sides. As most clearly indicated in FIG. 3, the surfaces on the opposite long sides of the thus formed radial protrusion 18, and the diametrically opposite portions of the rubber block 6 which face the opposite long sides of the radial protrusion 18, cooperate with each other to define a pair of shearing gaps 22, 22 as two opposite portions of the annular recess 16 which are opposite to each other diametrically of the inner sleeve 2, in a diametric direction perpendicular to the long sides of the rectangle of the radial protrusion 18. This diametric direction (horizontal direction in FIG. 3) is hereinafter referred to as "first diametric direction" where appropriate. More particularly, the shearing gaps 22, 22 extend substantially in a second diametric direction (vertical direction in FIG. 3) perpendicular to the first diametric direction, as shown in FIG. 3. Each of the shearing gaps 22, 22 is substantially U-shaped in cross section as viewed in a plane parallel to the axis of the inner sleeve 2 (bushing) and the first diametric direction. As indicated in FIG. 4, the U-shape of the shearing gap 22 is open toward the inner sleeve 2. The dimension of each shearing gap 22 as measured in the first diametric direction is selected within a range of about 1–6 mm.

The outer sleeve 4 is coated at its inner circumferential surface by a sealing rubber layer 24, as shown in FIGS. 1 and 2. This outer sleeve 4 is press-fitted on the outer circumferential surface of the sub-assembly 8, within a container or vessel containing a suitable viscous fluid such as silicone oil, which has a high kinematic coefficient of viscosity of at least 1,000 centistokes (cSt), preferably at least 10,000 cSt, and more preferably at least 100,000–1,000,000 cSt. In this manner, the instant fluid-filled resilient bushing is assembled, such that a generally annular fluid chamber 26 fluid-tightly closed by the outer sleeve 4 (sealing rubber layer 24) is filled with such a viscous fluid, as indicated in FIGS. 1 and 2. Further, the surfaces of the rubber layer 20 on the short sides of the rectangular of the radial protrusion 18, and the diametrically opposite portions of the outer sleeve 2 (rubber layer 2) aligned with the apertures 14, 14, cooperate with each other to define a pair of second gaps 28, 28 as two opposite portions of the annular fluid chamber 26 which are opposite to each other diametrically of the inner sleeve 2, in the second diametric direction (vertical direction of FIG. 1), in which the bushing is adapted to receive a vibrational load to be damped and isolated. This second diametric direction, or vibration-input direction as indicated at P in FIG. 1. As shown in the figure, the second gaps 28, 28 are substantially arcuate in transverse cross section of FIG. 1, or as viewed in a plane perpendicular to the axis of the bushing. The dimension of each second gap 28 as measured in the second diametric direction P is also selected within a range of about 1–6 mm.

The obtained bushing structure consisting of the sub-assembly 8 and the outer sleeve 4 pressed-fitted thereon is subjected to a suitable drawing operation for radially inward pre-compression, either within the fluid vessel in which the outer sleeve 4 is press-fitted on the sub-assembly 8, or after the assembled structure is removed from the vessel. This operation assures improved fluid tightness between the outer sleeve and the intermediate metal sleeve 12 by means of the sealing rubber layer 24. Subsequently, the opposite axial end portions of the outer sleeve 4 are roll-caulked radially inwardly against the corresponding end portions of the metal sleeve 12.

As indicated above, the thus prepared fluid-filled resilient bushing structure is installed on the vehicle such that vibrations are received in the secoid diametric direction P as indicated in broken-line arrow in FIG. 1. Upon application of a vibrational load to the bushing structure, the inner and outer sleeves 2, 4 are displaced relative to each other in the second diametric direction or vertical direction of FIG. 1. As a result, the surfaces of the radial protrusion 18 on its long sides and the opposite surfaces of the rubber block 6 which define the pair of shearing gaps 22, 22 are displaced in the opposite directions in the direction of application of the vibrational load, as indicated by solid-line arrows in FIG. 1. Consequently, the masses of the viscous fluid within the shearing gaps 22, 22 are subjected to shearing stresses. At this time, the relatively high kinematic viscosity of the fluid provides a viscosity resistance to the shearing stresses. This resistance exhibited upon application of the shearing stresses is expressed by the following equation:

$$F = (\mu A/h)\, v$$

where,
$\mu$: kinematic coefficient of viscosity of fluid
A: cross sectional of each shearing gap 22 as viewed in the plane of FIG. 1
h: dimension of each shearing gap 22 as viewed in the plane of FIG. 1
v: velocity of the vibrations Thus, the viscosity resistance F of the fluid is produced, without a substantive influence by the frequency of the input vibrations, and an effective vibration damping effect is provided by this resistance F based on the viscosity of the viscous fluid, which is proportional to the cross sectional area A of the shearing gaps 22, 22 at which the fluid masses are subject to shearing stresses due to the input vibrations.

Figure 5:
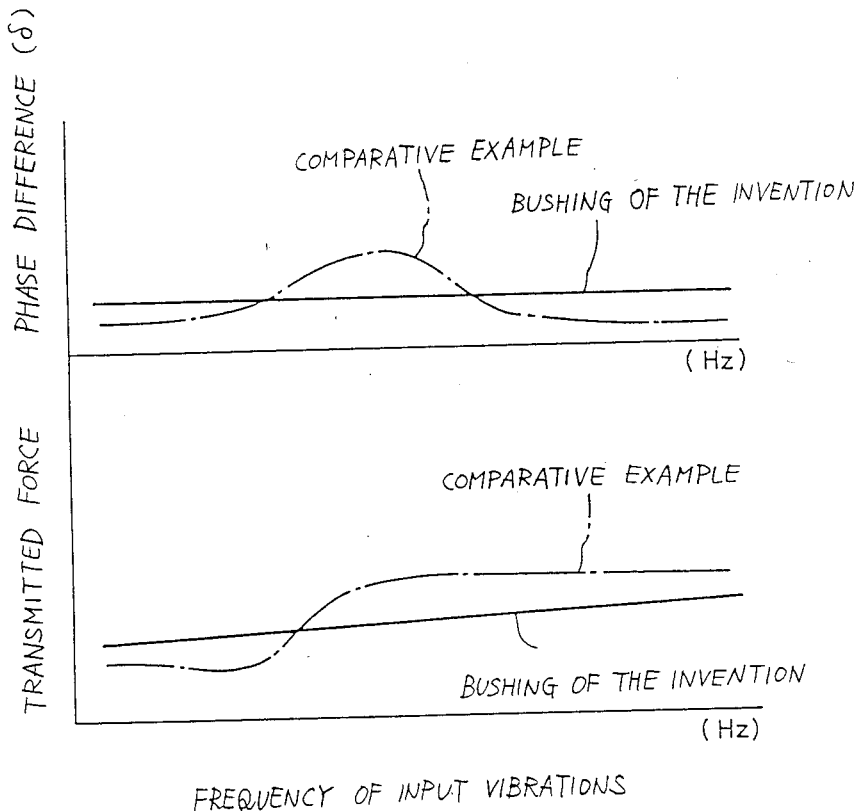
FIG. 5 is a graph representing operating characteristics of the fluid-filled bushing of the invention, as compared with those of a conventional fluid-filled bushing which has two fluid chambers communicating with each other through an orifice.

The damping characteristics of the instant fluid-filled resilient bushing are shown in FIG. 5, as compared with those of a conventional fluid-filled bushing which has two fluid chambers in communication with each other through orifice means. The graph of FIG. 5 indicates a relationship between phase difference and frequency of the vibrations having an amplitude of ±0.05 mm, and a relationship between the frequency of the vibrations and a force transmitted by the bushing upon application of the vibrations. As indicated in the figure, the force transmitted by the comparative conventional bushing is considerably larger than that of the instant bushing, at a frequency range higher than the resonance point. To the contrary, the force transmitted by the instant bushing does not significantly increase as the vibration frequency increases. In other words, the instant bushing filled with a viscous fluid exhibits a comparatively enhanced damping characteristic for high-frequency vibrations.

Further, the application of the vibrational load to the instant bushing in the second diametric direction P will also cause a relative radial displacement between the outer sleeve 4 and the surfaces on the short sides of the rectangle of the radial protrusion 18, thereby forcing the fluid masses in the arcuate second gaps 28, 28 so as to flow therethrough in the circumferential directions as indicated by solid-line arrows in FIG. 1. The fluid masses in the arcuate second gaps 28, 28 also provides a viscosity resistance to shearing stresses applied thereto, and thus contribute to enabling the bushing structure to exhibit a totally effective vibration damping effect for the input vibrations, in synergistic cooperation with the fluid masses in the shearing gaps 22, 22.

While the present invention has been described in detail in its preferred embodiment, it is to be understood that the invention is not limited to the precise details of the illustrated embodiment, but may be embodied with various changes, modifications and improvements, which may occur to those skilled in the art, without departing from the spirit and scope of the invention defined in the appended claims.

For example, while the inner and outer sleeves 2, 4 of the illustrated bushing are disposed concentrically with each other, these two sleeves may be disposed eccentrically with each other. Further the arcuate second gaps 28, 28 may be modified to extend substantially linearly parallel to the first diametric direction. In this case, the radial extension 18 and the rubber block 6 are suitable modified. However, the second gaps 28, 28 are not essential to practice the principle of the present invention, since the object of the invention may be attained without such second gaps.

The dimensions of the gaps 22, 28 or their cross sectional areas as viewed in the plane of FIG. 1 are suitably determined so that fluid masses in these gaps provide a desired viscosity resistance upon application of shearing stresses to the masses when the bushing receives a vibrational load. Namely, the gaps 22, 28 are dimensioned, depending upon expected amplitudes of shearing stresses applied, and a desired damping effect provided by the bushing.

Although the illustrated fluid-filled resilient bushing structure has been described as a tension rod bushing, it is equally effectively usable as other similar vibration damping and isolating bushing used on an automotive vehicle, such as body mounts, strut mounts, arm bushings, and engine-roll stoppers for F—F vehicles.

What is claimed is:

1. A fluid-filled resilient bushing comprising:
   an inner sleeve;
   an outer sleeve disposed in radially outwardly spaced apart relation with said inner sleeve;
   a generally annular resilient member interposed between said inner and outer sleeves, so as to resiliently connect the inner and outer sleeves, said generally annular resilient member including an axially intermediate portion which has a generally annular recess open in an outer circumferential surface thereof, said outer sleeve fluid-tightly closing said annular recess, and thereby cooperating with said resilient member to define a generally annular fluid chamber filled with a viscous fluid; and
   gap-forming means for defining a pair of shearing gaps as two opposite portions of said annular fluid chamber which are opposite to each other diametrically of said inner sleeve, in a first diametric direction perpendicular to a second diametric direction (P) in which the bushing receives a vibrational load, said pair of shearing gaps extending substantially in said second diametric direction, each shearing gap defined by a first face and an opposite second face, and each shearing gap having a dimension as measured in said first diametric direction, which dimension is determined to be small enough to enable masses of said viscous fluid in said shearing gaps to provide a viscosity resistance upon application of shearing stresses to said masses due to said vibrational load received by the bushing, the first and second faces being moved relative to each other parallel to the second diametric direction upon application of a vibrational load to the bushing in the second diametric direction.

2. A fluid-filled resilient bushing according to claim 1, wherein each of said pair of shearing gaps is substantially U-shaped in cross section in a plane parallel to an axis of the bushing and said first diametric direction, an U-shape of each of said shearing gaps being open toward said inner sleeve.

3. A fluid-filled resilient bushing according to claim 1, wherein said dimension of said pair of shearing gaps is within a range of 1-6 mm.

4. A fluid-filled resilient bushing according to claim 1, wherein said viscous fluid consists of a silicone oil.

5. A fluid-filled resilient bushing according to claim 1, wherein said viscous fluid has a kinematic coefficient of viscosity of at least 1000 cSt.

6. A fluid-filled resilient bushing according to claim 1, wherein said viscous fluid has a kinematic coefficient of viscosity of at least 10,000 cSt.

7. A fluid-filled resilient bushing according to claim 1, wherein said viscous fluid has a kinematic coefficient of viscosity within a range between 100,0000 and 1,000,000 cSt.

8. A fluid-filled resilient bushing according to claim 1, wherein said gap-forming means comprises said outer sleeve, and a radial protrusion which protrudes radially outwardly from said inner sleeve into said generally annular fluid chamber, at least a portion of said radial protrusion which directly faces an inner circumferential surface of said outer sleeve being formed of an elastomeric material.

9. A fluid-filled resilient bushing according to claim 8, wherein said outer sleeve and said radial protrusion cooperate with each other to define a pair of second gaps as two opposite portions of said generally annular fluid chamber which are opposite to each other diametrically of said inner sleeve, in said second direction.

10. A fluid-filled resilient bushing according to claim 9, wherein each of said pair of second gaps is substantially arcuate in cross section in a plane perpendicular to an axis of the bushing.

11. A fluid-filled resilient bushing according to claim 9, wherein a dimension of each of said pair of second gaps as measured in said second diametric direction is within a range of 1-6 mm.

12. A fluid-filled resilient bushing according to claim 8, wherein said radial protrusion consists of a metal ring fitted on said inner sleeve, and a rubber layer covering said metal ring.

13. A fluid-filled resilient bushing according to claim 8, wherein said radial protrusion has a substantially rectangular shape in cross section in a plane perpendicular to an axis of the bushing, said pair of shearing gaps being partially defined by a pair of opposite long sides of said substantially rectangular cross sectional shape.

* * * * *